United States Patent [19]

Noto et al.

[11] Patent Number: 4,803,629

[45] Date of Patent: Feb. 7, 1989

[54] POWER STEERING APPARATUS AND CONTROL SYSTEM FOR POWER STEERING APPARATUS HAVING A STEERING WHEEL ANGLE DETECTION DEVICE

[75] Inventors: Yasuo Noto, Katsuta; Noboru Sugiura, Mito, both of Japan

[73] Assignee: Hitachi, Ltd., Japan

[21] Appl. No.: 1,325

[22] Filed: Jan. 7, 1987

[30] Foreign Application Priority Data

Jan. 8, 1986 [JP] Japan .................................. 61-644

[51] Int. Cl.$^4$ ............................................ B62D 50/06
[52] U.S. Cl. ................................ 364/424.05; 180/142; 180/79.1
[58] Field of Search ................. 364/424, 426; 180/141–143, 79.1; 74/388 PS

[56] References Cited

U.S. PATENT DOCUMENTS

| | | | |
|---|---|---|---|
| 4,476,529 | 10/1984 | Nakamura et al. | 364/424 |
| 4,572,316 | 2/1986 | Kanazawa et al. | 180/143 |
| 4,602,695 | 7/1986 | Takeshima et al. | 180/143 |
| 4,645,025 | 2/1987 | Ohe et al. | 180/79.1 |
| 4,674,587 | 6/1987 | Suzuki et al. | 180/142 |
| 4,691,796 | 9/1987 | Tanooka et al. | 180/142 |

FOREIGN PATENT DOCUMENTS

0190678  8/1986  European Pat. Off.

*Primary Examiner*—Parshotam S. Lall
*Assistant Examiner*—Thomas G. Black
*Attorney, Agent, or Firm*—Ladas & Parry

[57] ABSTRACT

A control system for a power steering apparatus having a steering wheel angle detection device comprising a steering angle sensor for generating reference pulses at a plurality of steering wheel angle positions, including a neutral position of a steering wheel, and generating angle pulses as the steering wheel is rotated, an up-/down counter for counting up or down the angle pulses supplied from the steering angle sensor depending on the direction of rotation of the steering wheel, and a vehicle velocity sensor for detecting the vehicle velocity. When the vehicle velocity detected by the vehicle velocity sensor is higher than a predetermined velocity and a reference pulse is detected by the steering angle sensor which is determined to be a steering wheel straight ahead position then the up/down counter is reset to zero.

12 Claims, 5 Drawing Sheets

POWER STEERING APPARATUS AND CONTROL SYSTEM FOR POWER STEERING APPARATUS HAVING A STEERING WHEEL ANGLE DETECTION DEVICE

The present relates to a power steering apparatus and to a control system for a power steering apparatus having a detection device for detecting the angular rotation of a steering wheel, and more particularly to a control system for controlling an automobile electric power steering apparatus.

Power steering systems reduce manual steering power necessary to manipulate a steering wheel. In the past, many power steering systems have used oil pressure actuators. Recently an electric power steering apparatus has been noted which uses an electrically driven actuator to perform a variety of steering control functions.

The electric power steering apparatus uses the angular rotation of the steering wheel, hereinafter referred to as steering wheel angle, as one of its parameters. For example, JP-A-No. 58-202803 discloses an analog control type electric power steering system which uses an encoder which utilises a slidable variable resistor linked to a steering wheel in order to detect the steering wheel angle.

However, the prior art slidable variable resistor is subject to problems of sliding noise, shift of reference due to temperature change and life time, and sufficiently high reliability is hard to attain.

It is an object of the present invention to provide a control system for a power steering apparatus having a steering wheel angle detection device which can be digitally operated, detect an exact steering wheel angle and control the power steering with a high reliability.

According to one aspect of this invention there is provided a control system for a power steering apparatus including a steering angle sensor means arranged to detect each revolution of a steering wheel from a predetermined datum including at said datum and to produce an output signal indicative thereof, said steering angle sensor means also being arranged to detect discrete angular positions of said steering wheel during each revolution thereof and to produce a signal indicative of each said angular position; a counter means for counting the signals indicative of each angular position; vehicle velocity determination means; resetting means for said counter means, whereby said resetting means reset the counter means when the vehicle velocity determination means indicates a velocity above a predetermined value and said steering angle sensor produces an output signal indicative of said predetermined datum; and control means for effecting power steering control by utilising the count of said counter means as a parameter.

According to another aspect of this invention there is provided a power steering apparatus having a control system therefor, said control system including a steering angle sensor means arranged to detect each revolution of a steering wheel from a predetermined datum including at said datum and to produce an output signal indicative thereof, said steering angle sensor means also being arranged to detect discrete angular positions of said steering wheel during each revolution thereof and to produce a signal indicative of each said angular position; a counter means for counting the signals indicative of each angular position; vehicle velocity determination means; resetting process for said counter means, whereby said resetting means resets the counter means when the vehicle velocity determination means indicates a velocity above a predetermined value and said steering angle sensor produces an output signal indicative of said predetermined datum; and control means for effecting power steering control by utilising the count of said counter means as a parameter.

In accordance with the present invention, reference pulses are generated at a plurality of steering wheel angle positions including a neutral position (straight ahead position of a vehicle) of the steering wheel, and angle pulses are generated by rotation angle sensor as the steering wheel is rotated. The reference pulses detected when a vehicle speed is higher than a predetermined speed is used as a reference angle position pulse and the angle pulses are counted up or down with respect to the reference angle position pulse to detect the steering angle.

An embodiment of the present invention will be described by way of example with reference to the accompanying drawings, in which.

The control system for the power steering apparatus of the present invention is explained in etail with reference to the illustrated embodiments.

Figure 1:
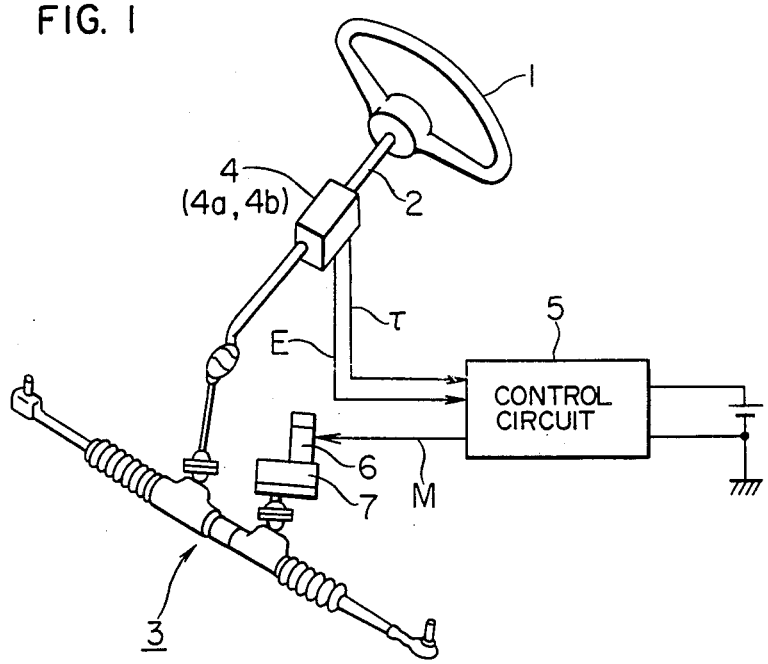
FIG. 1 shows one embodiment of a power steering apparatus with which the control system of the present invention is utilised.

FIG. 1 shows a conventional electric power steering apparatus which uses a power assisting motor in a rack-and-pinion type steering system. A steering force (steering torque) γ applied by a driver to a rack-pinion mechanism 3 from a steering wheel 1 through a steering shaft 2 is detected by a torque sensor 4a in a sensor unit 4. The detected signal is supplied to a control circuit 5 which in turn supplies a corresponding control signal M to a motor 6. The motor 6 applies an additional force to the rack-pinion mechanism 3 through a reduction gear 7 so that the steering force γ is reduced.

In the presently described embodiment of an electric power steering system, a steering angle sensor 4b for detecting the angular rotation of the steering shaft 2 is provided in the sensor unit 4. The angular rotation of the steering wheel from a neutral position of the steering wheel is detected and the sensor unit 4 produces a corresponding output signal E so that appropriate restoring force control for the steering wheel is carried out.

Figure 2A:
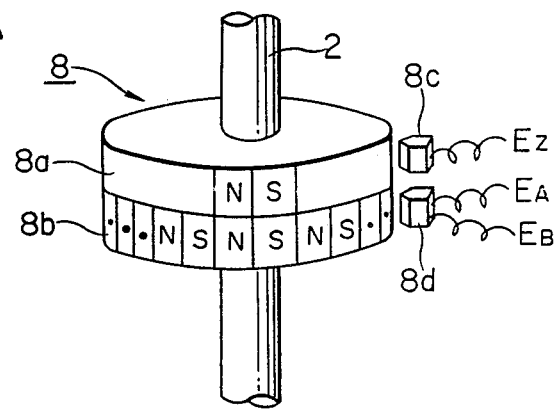
FIGS. 2A and 2B show a steering angle sensor used in the present invention.
Figure 2B:
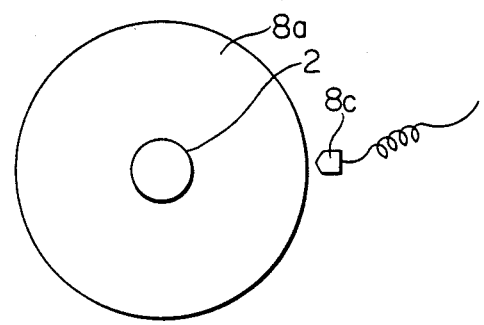

FIGS. 2A and 2B show one form of the steering angle sensor 4b used in the control system of the present invention. The sensor 4b comprises two disks 8a and 8b each having magnetic N-poles and S-poles magnetised on its periphery, and magnetic detection heads 8c and 8d such as magneto-restrictive elements arranged near the periphery.

The disk 8a has only one pair of N and S poles arranged on the periphery, while disk 8b has N and S poles alternately magnetised on its periphery. When the steering wheel 1 is rotated, the head 8c produces only one pulse per revolution at a predetermined angular position. When the steering wheel is rotated from left to right (lock-to-lock), the head 8c produces a plurality of pulses (called reference pulses $E_Z$). One of these $E_Z$ pulses corresponds to the neutral or straight ahead position N of the steering wheel.

The disk 8b has 600 pairs of N-poles and S-poles arranged on the periphery thereof. Thus, the head 8d produces one pulse for each 0.6 degree of rotation of the steering wheel 1. The head 8d has two detectors which are spaced from each other by ¼ pitch along the periphery of the disk 8b. Accordingly, two pulses (angle pulses $E_A$ and $E_B$) having a phase difference of 90 degrees therebetween are generated as the disk 8b rotates.

Figure 3A:
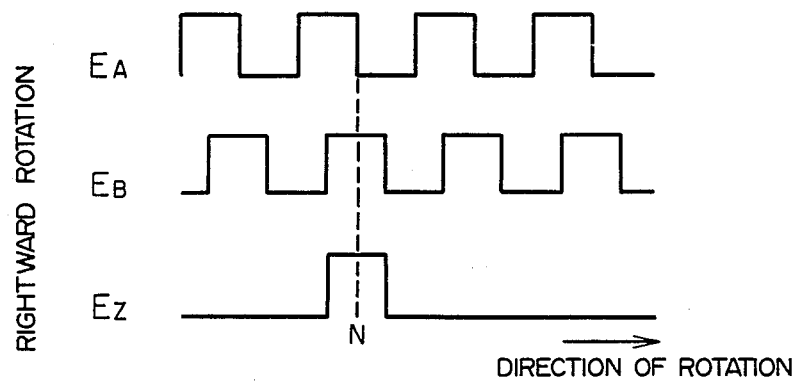
FIGS. 3A and 3B show output signals of the steering angle sensor.
Figure 3B:
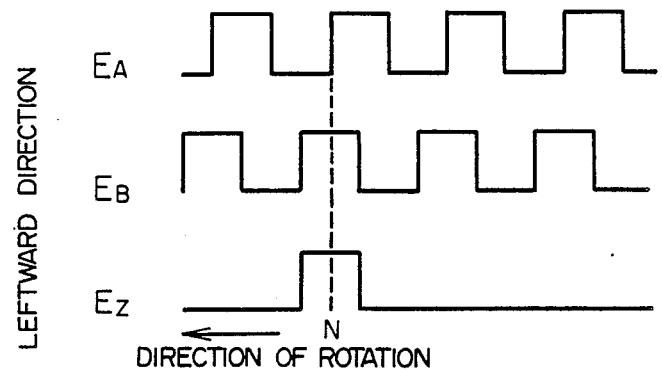

When the steering wheel is rotated rightward (clockwise), the head 8d detects the angle pulse $E_A$ and $E_B$ as shown in FIG. 3A, and when it is rotated counter clockwise, the head 8d detects the pulses as shown in FIG. 3B.

The sensor shown in FIGS. 2A and 2B is called a rotary encoder. In an alternative form of the encoder, the periphery of the disk 8b is provided with a plurality of holes corresponding in number to the magnetic poles and the holes may be detected by photo-couplers to produce the required pulse signals.

Figure 4:
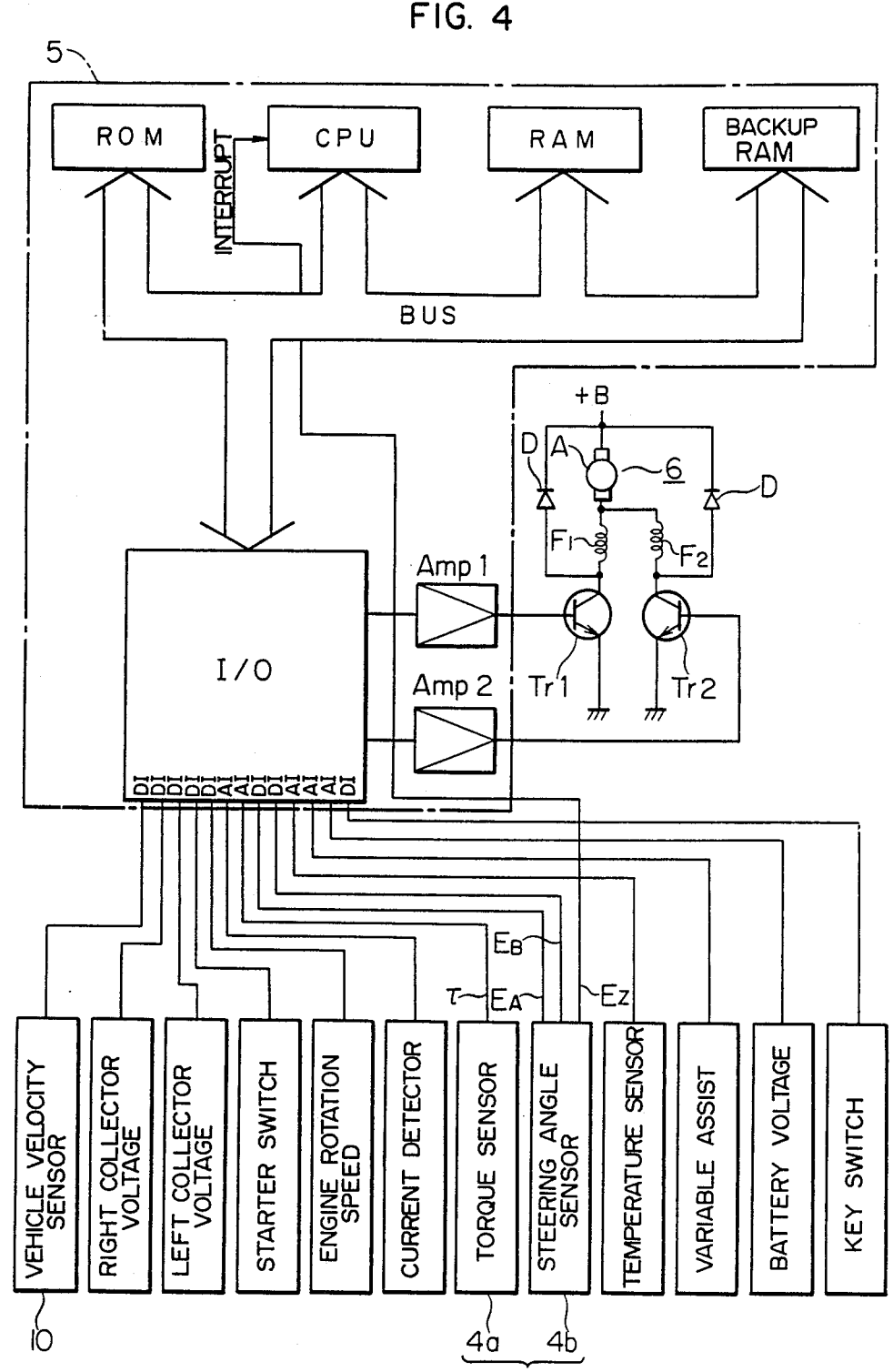
FIG. 4 shows a block diagram of a circuit configuration of one embodiment of the present invention.

FIG. 4 shows an embodiment of the control circuit 5 constructed utilising a microcomputer. A CPU which is the heart of the control circuit reads various data including the pulses $E_Z$, $E_A$, $E_B$ from the steering angle sensor 4b, a torque signal $\tau$ from a torque sensor 4C and a vehicle velocity signal from a vehicle velocity sensor 10, through I/O, processes them together with data stored in a ROM and a RAM, supplies control signals to transistors Tr1 and Tr2 in a control circuit of motor 6 through amplifiers Amp1 and Amp2 to apply an assisting steering force and a steering angle controlling steering force to the motor 6. An apparatus for generating such control signals is known, for example, by U.S. Pat. No. 4,476,529.

The motor 6 has two field coils $F_1$ and $F_2$. The motor 6 is rotated by turning on only one of the transistors Tr1 and Tr2, the direction of rotation being controlled by which of the transistors Tr1 and Tr2 is selected to be turned on. In FIG. 4, A denotes an armature and D denotes a flywheel diode.

As described above, the steering angle sensor 4b generates 600 pulses $E_A$ and $E_B$ per revolution of the steering handle. Assuming that three revolutions are required to rotate the steering wheel in the present embodiment from the left to the right limit, 1800 pulses $E_A$ and 1800 pulses $E_B$ are generated in the three revolutions.

In the present embodiment, an up/down counter which can count from +900 to −900 is used as a steering angle counter. A positive count represents a rightward (clockwise) steering angle and a negative count represents a leftward (counter clockwise) steering angle. When the steering angle is zero, that is, at the neutral position N, the count of the counter is zero.

The up/down counter is a software counter and the count is stored in a Random Excess Memory (RAM). Accordingly, when an ignition key of the vehiclew is turned to its off position, the count of the counter is cleared, and when the ignition key is turned to its on position, the count is reset to zero.

The pulses $E_A$ and $E_B$ are not counted until the steering angle reaches the neutral position, when the counting of the pulses is started. Thus, the count of the counter represents the steering angle, and the restoring force control in the power steering system is disclosed in U.S. Pat. No. 4,476,529, the power assisting force control in accordance with the vehicle velocity or the actuator inertia compensation control as disclosed in JP-A-No. 60-193765 is carried out based on he detected steering angle. The power assisting control to reduce the steering force of the steering wheel is carried out in a known method at the time of starting the engine independently from the steering angle.

In the system in which the steering angle is detected by counting the angle pulses, it is essential to detect the time when the steering angle actually reaches the neutral position.

In the present embodiment, whether the steering angle has actually reched the neutral position or not is detected by the reference pulse supplied from the steering sensor 4b, as described below.

In FIGS. 2A and 2B, the physical position of the steering angle sensor 4b relative to the steering shaft 2 is appropriately selected such that the reference pulse $E_Z$ is generated when the steering angle actually reaches the neutral position. Thus, the counting of the angle pulses is started at the point of generation of the pulse $E_Z$.

However, as described above, the reference pulse $E_Z$ is generated a plurality of times, for example, three times in the present embodiment, in the variable range of the steering angle from lock to lock. The reference pulse is generated at the neutral position but it is also generated when the steering angle is not at the neutral position. Accordingly, the neutral position cannot be detected only by the generation of the reference pulse.

In the present invention, if the reference pulse is generated when the velocity of the vehicle whose steering angle is to be detected is higher than a predetermined velocity, it is assumed that the steering angle is at the neutral position to discriminate the reference pulse generated at the neutral position from the reference pulses generated at other positions. The reaction therefor is explained below.

Figure 5:
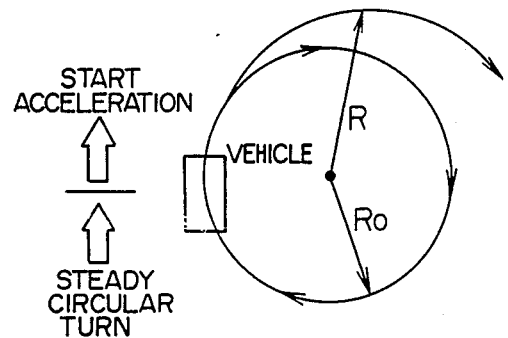
FIG. 5 illustrates a principle of operation of the present invention.

In FIG. 5, it is assumed that a vehicle is turning at a certain velocity and at a steering angle which results in a radius of turn of $R_O$. If the velocity is increased, lateral slip will finally occur and the radius of turn $R_O$ cannot be maintained and it increases to R ($R > R_O$). Accordingly, it is necessary to recuce the steering angle. It is thus apparent that as the vehicle velocity increases, the steering angle which assures stable running of the vehicle decreases. In other words, as the vehicle velocity increases, a large steering angle is not permitted.

As described above, the reference pulse $E_Z$ is generated at a plurality of steering angle positions in the variable range of the steering angle. Assuming that the reference pulse $E_Z$ is generated three times in the variable range of the steering angle, the steering angles at which the reference pulses are generated at other than the neutral position must be very large, either leftward or rightward, and it will be practically impossible to drive the vehicle at such a large steering angle if the vehicle velocity is higher than a predetermined velocity.

Accordingly, the true neutral position can be detected by using the reference pulse detected when the vehicle velocity is higher than the predetermined velocity.

Figure 6:
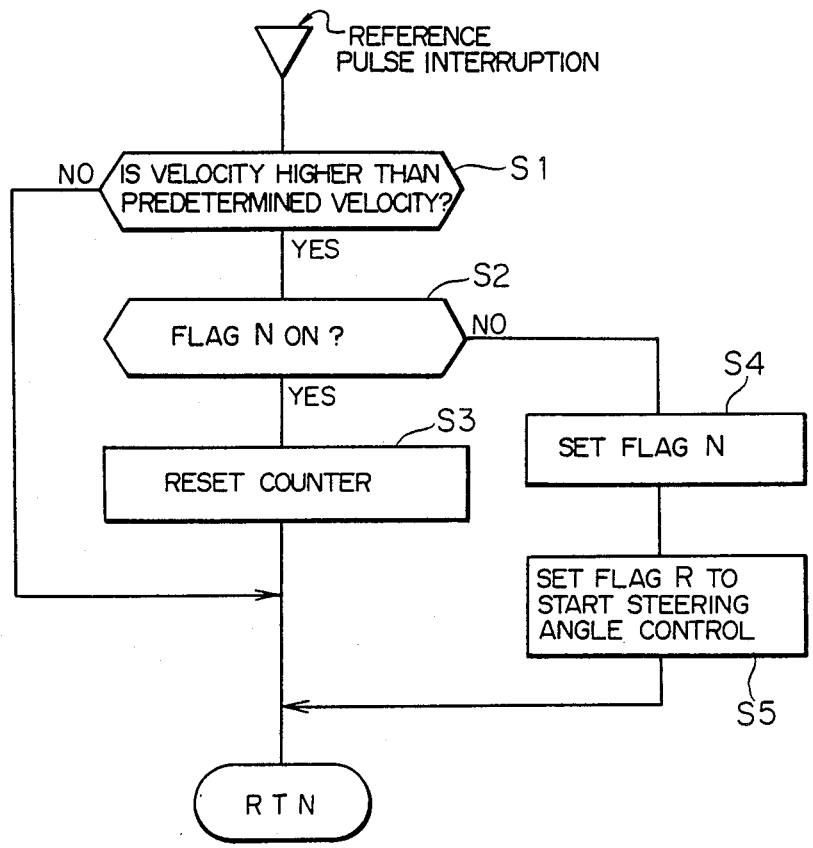
FIGS. 6 to 8 show flow charts for explaining the operation of the present invention.

In the present embodiment, as shown in FIG. 6, an interruption is carried out each time the reference pulse is generated. In a step S1, a check is made to determine whether or not the vehicle velocity has reached a predetermined velocity, 40 Km/h in the present embodiment. If the decision is NO, no further processing is required and the process is terminated. The vehicle velocity may be detected by using the pulse train from the velocity sensor 10 shown in FIG. 4.

If the decision in the step S1 is YES, the process proceeds to step S2 where a flag N (neutral flag) in the RAM is checked.

If the decision in the step S2 is YES, that is, if the flag N has been set, the process proceeds to step S3 where the up/down counter is reset. Then, the process starts again.

If the decision in the step S2 is NO, that is, if the flag N has not yet been set, the process proceeds to step S4 where the flag N is set to start the up/down counter. In step S5, a flag R for instructing the execution of the steering angle control is set. Then, the process begins again.

Figure 7:
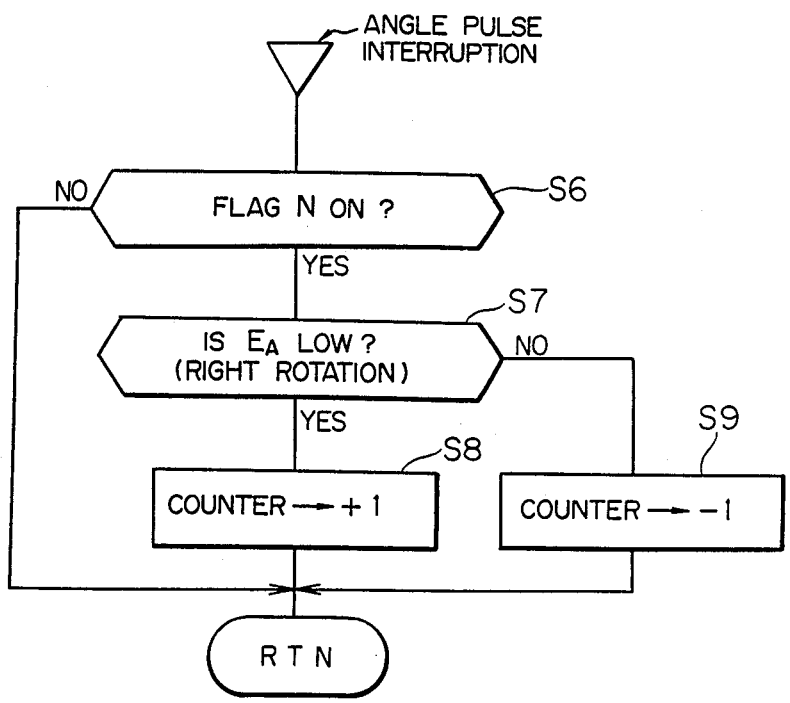

FIG. 7 shows a process which is carried out each time the angle pulse $E_B$ is switched from HIGH to LOW. In step S6, a check is made to determine whether or not the flag N has been set. If the decision is NO, that is, if the flag N has not yet been set, the process starts again.

If the decision in the step S6 is YES, that is, if the flag N has been set, the direction of rotation is checked in step S7. Since the check is carried out at the occurrence of the angle pulse $E_B$ shown in FIGS. 3A and 3B, a check to determine whether or not the angle pulse $E_A$ is LOW is made at the occurrence of the angle pulse $E_B$ in the step S7. If the angle pulse is LOW, the angle pulses $E_A$ and $E_B$ are in the relationship shown in FIG. 3A and the steering wheel has been rotated in the rightward direction. If $E_A$ is HIGH in the step S7, the angle pulses $E_A$ and $E_B$ are in the relationship shown in FIG. 3B and the steering wheel has been rotated in the leftward direction. Accordingly, if the decision in step S7 is YES, that is, rightward rotation, the steering angle up/down counter is incremented by one in step S8 and if the decision is NO, that is, leftward rotation, the up/down counter is decremented by one in step S9. Then, the process begins again.

In the present embodiment, the steering angle, that is, the angle representing the deviation from the straight direction (neutral position) of the steering wheels of the vehicle is detected by the content of the up/down counter in the control circuit 5.

Figure 8:
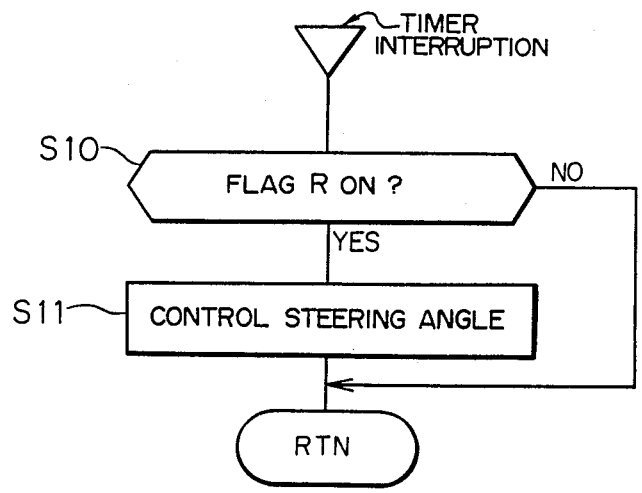

FIG. 8 shows a process which is carried out at a predetermined time interval by timer interruption. In step S10, a flag R is checked, and if the flag R has been set, the steering angle control is carried out in a step S11 in accordance with the count of the up/down counter in a known manner.

In accordance with the present invention, as shown in FIG. 6, the setting of the flag N is prevented until the vehicle velocity reaches the predetermined velocity in step S1. As shown in FIG. 7, the counting of the angle pulse $E_B$ is prevented until the flag N is set in step S6.

If the reference pulse is generated, the flag N is set in step S4 if the vehicle velocity is higher than the predetermined velocity (40 Km/h), and the counting of the angle pulses is enabled.

In accordance with the present embodiment, counting is started from the true neutral position of the steering wheel so that the exact steering angle is detected by the steering angle sensor 4b.

In the present embodiment, as seen from FIG. 6, when the decisions in steps S1 and S2 are both YES, that is, when the neutral position of the steering wheel is reached even after the flag N has been set and the counting has been started, the counter is reset in step S3 so that accumulation of error count due to noise is prevented. The counter counts the angle pulses which represent the steering angle by the process of FIG. 7. If error signals caused by noise are counted, the error signals appear as an error of the steering angle and such an error may be accumulated each time the error count appears. On the other hand, if the decision in the step S1 is YES, the steering angle is at the neutral position and the count of the counter should be zero. If it is not zero, it means that the error is included. Since the counter is reset in step S3, the error is always corrected and the correct steering angle is detected.

In the present embodiment, step S5 of FIG. 6 is provided. Thus, when the counting of the counter is started to detect the steering angle, the flag R is set. Accordingly, as shown in FIG. 3, the steering wheel angle control such as restoring force control is started after the steering angle detection is enabled. The power assist force may also be in accordance with one of the vehicle velocity and actuator inertia compensation control in the power assist control mode. Thus, proper steering angle control is always attained.

We claim:

1. A control system for a power steering apparatus including a steering angle sensor means for detecting each revolution of a steering wheel from a predetermined datum including at said datum and to produce an output signal indicative thereof, said steering angle sensor means also being for detecting discrete angular positions of said steering wheel during each revolution thereof and to produce a signal indicative of each said angular position; a counter means for counting the signals indicative of each angular position; vehicle velocity determination means; resetting means for said counter means, whereby said resetting means reset the counter means when the vehicle velocity determination means indicates a velocity above a predetermined value and said steering angle sensor produces an output signal indicative of said predetermined datum; and control means for effecting power steering control by utilising the count of said counter means as a parameter.

2. A control system according to claim 1, wherein said datum is a straight ahead position of the steering wheel.

3. A control system according to claim 2, wherein the counter means is an up/down counter for counting up in one angular direction of rotation of the steering wheel and to count down in an another opposite direction of rotation of the steering wheel whereby when the counter means is reset by said resetting means the steering wheel is at said straight ahead position.

4. A control system according to claim 1, wherein the control means has means for effecting at least one of restoring force control when the steering force of the steering handle is small, power assist force control in accordance with the vehicle velocity and actuator inertia compensation control in the power assist control mode.

5. A control system according to claim 1, wherein said steering angle sensor means is a rotary encoder.

6. A control system according to claim 5, wherein the rotary encoder is adapted to rotate with the steering wheel and comprises a plurality of first members arranged in a ring representative of said angular positions for determining the angular rotation of the steering wheel, and a second member determining each of the steering wheel revolutions to provide a reference signal, a first detector facing the first members for detecting two angle signals having a phase difference therebetween to detect the direction of rotation of the steering wheel, and a second detector facing the second member for determining the reference signal represented by the second member.

7. A control system according to claim 6, wherein the first member has magnetic S-poles and N-poles alternately located thereon, the second member has a pair of magnetic N and S poles, and the first and second detectors are magneto-restrictive elements.

8. A control system according to claim 6, wherein said first detector has two detecting elements for producing signals having a phase difference of 90° therebetween.

9. A control system according to claim 3, wherein said up/down counter is a software counter.

10. A control system according to claim 6, wherein said vehicle velocity determination means determines whether the vehicle velocity exceeds 40 Km/h.

11. A control system according to claim 10, wherein said vehicle determination means has means for executing the determination each time the reference signal is detected by the steering angle sensor means.

12. A power steering apparatus having a control system therefor, said control system including a steering angle sensor means for detecting each revolution of a steering wheel from a predetermined datum including at said datum and to produce an output signal indicative thereof, said steering angle sensor means also for detecting discrete angular positions of said steering wheel during each revolution thereof and to produce a signal indicative of each said angular position; a counter means for counting the signals indicative of each angular position; vehicle velocity determination means; resetting means for said counter means, whereby said resetting means resets the counter means when the vehicle velocity determination means indicates a velocity above a predetermined value and said steering angle sensor produces an output signal indicative of said predetermined datum; and control means for effecting power steering control by utilising the count of said counter means as a parameter.

* * * * *